United States Patent [19]
Frechtling

[11] 3,899,944
[45] Aug. 19, 1975

[54] TOOLPOST STRUCTURE

[76] Inventor: Hank Frechtling, 236-2 Prescott, E. Quad Hall, 701 E. University, Ann Arbor, Mich. 48104

[22] Filed: Mar. 12, 1974

[21] Appl. No.: 450,301

[52] U.S. Cl. .................................................. 82/36
[51] Int. Cl. ........................................... B23b 29/00
[58] Field of Search .............. 82/35, 36, 36 A, 37; 29/96

[56] References Cited
UNITED STATES PATENTS

| | | | |
|---|---|---|---|
| 2,621,396 | 12/1952 | Gracchi | 82/36 A X |
| 2,649,647 | 8/1953 | Sternbergh | 29/96 |
| 3,226,797 | 1/1966 | Hertel | 29/96 |
| 3,572,195 | 3/1971 | Gourley | 82/36 |
| 3,602,077 | 8/1971 | Mitchell | 82/36 |

*Primary Examiner*—Harrison L. Hinson
*Attorney, Agent, or Firm*—Basile and Weintraub

[57] ABSTRACT

A toolpost structure for use on a lathe, or the like, the toolpost structure having a plurality of perpendicular working surfaces which include therebetween coupling mechanisms, each adapted to engage and clampingly attach corresponding perpendicularly disposed working surfaces of a tool holder to the working surfaces of the toolpost structure. Various clamping means for engaging and retaining the coupling mechanism are disclosed.

4 Claims, 3 Drawing Figures

PATENTED AUG 19 1975  3,899,944

TOOLPOST STRUCTURE

BACKGROUND OF THE INVENTION

I. Field of the Invention

The present invention relates to toolpost structures and associated tool holders for mounting cutting tools on a lathe or similar machine tools and, in particular, the present invention relates to a quick change toolpost structure whereby a tool holder may be rigidly gripped by and held to the toolpost structure.

II. Description of the Prior Art

Many different toolpost structures are presently in use and have been described in the prior art such as the toolpost structures and tool holders disclosed in U.S. Pat. Nos. 2,716,799, 2,838,826, 3,572,195, 3,577,819, 3,602,077 and 3,648,551. Each of the structures disclosed in the aforementioned United States Patents have what appear to be successful solutions to the problem of attaching a tool holder to a toolpost. In previous toolposts, such as the type disclosed in the aforementioned patents, quick change type toolholders and posts tend to be unduly expensive to manufacture because of their inherently complex structure. Many of the prior art structures exposed surfaces from acute angles which are not only difficult to keep clean, but which are expensive to fabricate. In addition, because of the acute angles or pockets that are formed by the working surfaces between the tool holder and the toolpost, the pockets associated with an idle mounting position tend to accumulate chips produced during the machining with a tool mounted in another position. Thus, it would be desirable to provide a quick change toolpost structure which does not require the complex structure or various acute surfaces, as aforementioned.

Many of the aforementioned prior art quick change toolpost structures are complex, have numerous parts and are of an open design that admits chips and dirt such that they must be cleaned frequently. This complexity in construction generally results in a shorter life for the conventionally available toolposts and the ultimate desired result of a quick adjustment and readjustment accomplished in simplicity and with ease is often absent from the conventional toolpost design.

SUMMARY OF THE INVENTION

The present invention which will be described subsequently in greater detail comprises a toolpost structure having perpendicular working surfaces which supportingly engage complimentary shaped working surfaces of a tool holder when a coupling mechanism carried by the toolpost structure is clamped into position by means of one of several inventive clamping arrangements.

It is therefore an object of the present invention to avoid the aforementioned disadvantages of the prior art structures by providing a toolpost structure which is simple in its design and inexpensive to manufacture.

It is a further object of the present invention to provide a quick change toolpost structure which will be highly accurate for positioning of a tool holder with respect to the toolpost block and which insures a rigid support of the tool holder by the toolpost structure, yet one which may be quickly and simply and efficiently changed, as desired.

Other objects, advantages and applications of the present invention will become apparent to those skilled in the art of toolpost structures when the accompanying example of the best mode contemplated for practicing the present invention is read in conjunction with the accompanying drawing.

BRIEF DESCRIPTION OF THE DRAWING

The description makes reference to the accompanying drawing wherein like reference numerals refer to like parts throughout the several views, and in which.

DESCRIPTION OF THE PREFERRED EMBODIMENT

Figure 1:
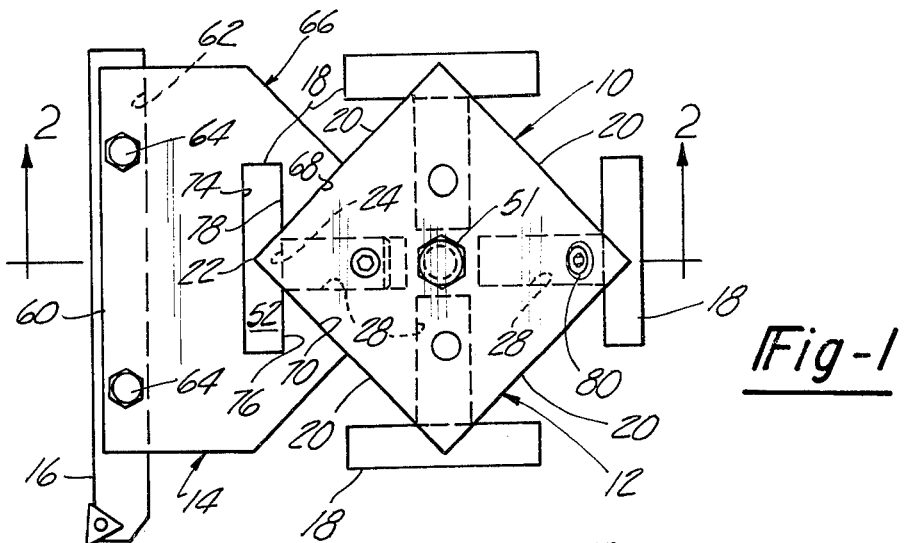
FIG. 1 is a top plan view of a toolpost structure comprising a toolpost block and tool holder, all of which are constructed in accordance with the principles of the present invention.

Referring now to the drawing wherein there is illustrated one example of the preferred embodiment in the form of a toolpost structure 10 comprising a toolpost block 12 and a tool holder 14 having a tool 16 mounted thereto. The tool holder 14 is attachable to the toolpost block 12 by means of a coupling mechanism 18. The coupling mechanism 18 is attachable to each of the four lengthwise corners 22 of the toolpost block 12 such that a tool holder 14 may be coupled to each of the four corners, even though only one tool holder 14 is illustrated.

It should also be understood that the description of the tool holder 14 and of the one coupling mechanism 18 is for purposes of clarity and that this description is applicable to other tool holders and coupling mechanisms that are not illustrated or discussed in detail.

Figure 2:
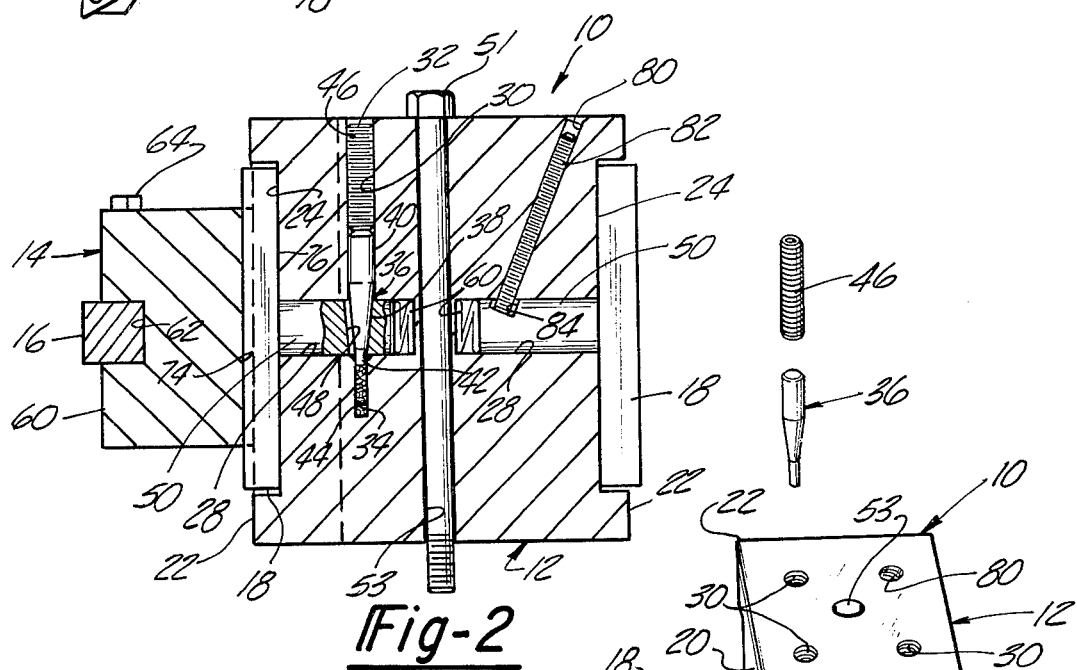
FIG. 2 is a fragmentary cross sectional view of the toolpost structure taken along line 2—2 of FIG. 1, and illustrating two preferred examples for clamping a coupling mechanism to the toolpost block.

The toolpost block 12 is generally rectangularly shaped in cross section having four perpendicular outer working surfaces 20 of equal width and, if desired, of equal height. Each of the lengthwise corners 22, that is, the longitudinal edges of each adjacent perpendicular working surface 20, is provided with a longitudinal slot 24. Each slot 24 has a blind bore 28 that extends horizontally inwardly into the block 12. As can best be seen in FIG. 2, the toolpost block 12 is further provided with a plurality of vertically disposed clamping pin bores 30 which consist of an upper clamping pin bore 32 that is partially threaded from the upper surface of the block 12 and downwardly a predetermined amount. A lower clamping pin bore 34 is axially aligned with the upper bore 32 and is of a smaller cross sectional area. The clamping pin bore 30 slidably supports a tapered clamping pin 36 which comprises a tapered midsection 38 that respectively terminates at its upper end in a circular shaped portion 40 that is slidably disposed in the lower portions of the upper clamping pin bore 32, and a lower cylindrical portion 42 that is slidably disposed within the lower clamping pin bore 34. A spring 44 within the lower bore 34 exerts an upwardly bias against the clamping pin 36 tending to urge the same upwardly. This upward movement of the pin 36 is restrained by the abutment with the lower edge of a threaded member 46. The threaded member 46 is utilized to position the clamping pin 36 with respect to a tapered bore 48 that is formed within a plunger 50 of the coupling mechanism 18.

Figure 3:
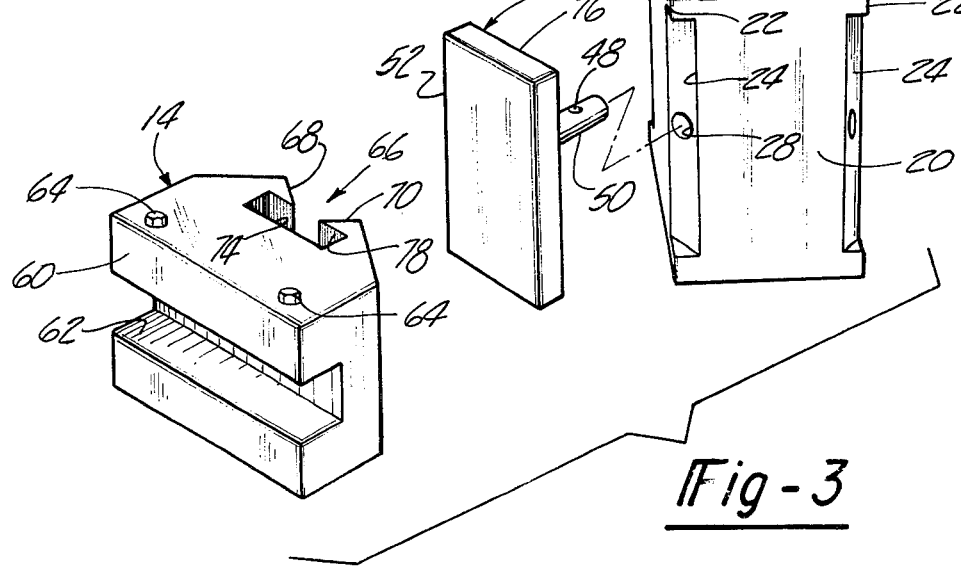
FIG. 3 is an exploded perspective view illustrating the toolpost structure of FIGS. 1 and 2.

As can best be seen in FIG. 3, the coupling mechanism comprises a rectangularly shaped base plate 52 on which one end of the plunger 50 is securely attached by any suitable means. The tapered bore 48 within the plunger 50 is adapted to be vertically aligned between the upper and lower bores 32 and 34 such that the clamping pin 36 may be inserted through the tapered bore 48 of the plunger 50 whereby the lower portion 42 of the clamping pin 30 is slidably supported within the lower clamping pin bore 34 and the upper cylindrical portion 40 of the clamping member is slidably supported in the upper clamping pin bore 32. In such a position, it is obvious that the tapered surface 38 of the clamping pin is disposed within the larger and eccentrically disposed tapered bore 48 of the coupling mechanism plunger 50.

It can thus be seen that when the threaded member 46 is threaded downwardly into the clamping pin bore 30 against the bias of spring 44 to move the clamping pin 36 downwardly, the tapered surface of the tapered section 38 will engage the right side of the tapered bore 48 exerting a force on the plunger 50 to shift the same inwardly into the blind bore 28 wherein the plunger 50 is normally received. Thus, the clamping pin 36 not only exerts a clamping or holding force on the plunger 50 but initially shifts the same rightwardly to exert a holding force on the tool holder 14, as will be described in detail hereinafter. This force which moves the plunger 50 inwardly within the blind bore 28 is resisted by means of a spring 60 disposed at the inner end of each blind bore 28.

As aforementioned, the coupling mechanism 18 functions to provide a means for quickly and easily connecting the tool holder 14 to the toolpost structure 12. The toolpost 12, in turn, is attached by means of a threaded fastener 51 that extends through the longitudinal bore 53 at the center of the toolpost block 12 for the purpose of attaching the same to a lathe slide or the like in the conventional manner.

The tool holder 14 comprises a generally rectangular block with an outer face 60 that is available for the mounting of the cutting tool 16 by means of a horizontal groove 62 and vertically disposed fastening members 64 that extend downwardly through threaded bores (not shown) in the upper portion of the tool holder 14 and which engage the tool 16 in the conventional manner. The opposite or inner face of the tool holder 14 has a V-shaped slot 66 formed with two working faces 68 and 70 that are perpendicular to each other. The V-shaped slot 66 terminates in a rectangularly shaped inner slot 74. The slot 74 is sized to receive the rectangularly shaped base plate 52 of the coupling mechanism 18 such that the inwardly disposed surface 76 of the coupling mechanism 18 slidingly and abuttingly engages the inner surfaces 78 of the slot 74. It can thus be seen in FIG. 1 that when the coupling mechanism 18 is positioned outwardly from the block 12 a sufficient distance to permit the same to be received within the longitudinal slot 74 of the tool holder 14, the outer working surfaces 68 and 70 of the tool holder are complimentarily disposed with respect to the working surfaces 20 of the block 12 and the corner lengthwise edge 22 of the block 12 is received within the V-shaped groove 66 of the tool holder 14. It can be further seen that by the tightening down of the threaded member 46 within the clamping pin bore 30, the clamping pin 36 is moved downwardly to engage the tapered bore 48 of the plunger 50 and move the same inwardly into the blind bore 28 against the bias of the spring 60, forcing the aforementioned working surfaces 20, 68 and 70 into a locking engagement and thereby securely attaching the tool holder 14 to the toolpost block 12.

It can also be seen that by rotating the threaded member 46 to withdraw the same from the clamping pin bore 30 the spring 44 in the lower clamping pin bore 34 will move the clamping pin 36 upwardly and out of engagement with the tapered bore 48 of the plunger 50 such that the spring 60 may exert an outward force against the plunger moving the same laterally outwardly of the bore 28 causing a disengagement of the working surfaces 68, 70 and 20 whereby the tool holder 14 may be simply raised and removed from the coupling mechanism base plate 52.

Referring again to FIG. 2, wherein there is illustrated an alternate manner for clamping the plunger 50 into the aforementioned desired coupling position. This alternate embodiment comprises a threaded bore 80 that intersects and is inclined with respect to the horizontally disposed bore 28. The threaded bore 80 receives a threaded member 82, the lower end of which is adapted to engage a slotted section or portion 84 formed in the upper surface of the plunger 50 and move the same inwardly against the bias of the spring 60 whereby the coupling mechanism 18 functions in the aforementioned manner with the lateral inwardly movement of the coupling mechanism 18 being provided by means of the inclined member 82 and its inward movement against the plunger slot 84.

It can thus be seen that the present invention has provided a toolpost structure having all of the aforementioned desired advantages and objects as set forth hereinbefore, yet one which is simple in its design, and thus, inexpensive to manufacture.

Although only one example of the present invention has been provided, it should be apparent to those skilled in the art of toolpost structures that other forms may be had, all coming within the spirit of the present invention and scope of the appended claims.

What is claimed is as follows:

1. A toolpost structure for a lathe or the like, said toolpost structure comprising a block having a generally rectangularly shaped cross section with four perpendicular outer working surfaces, one of the lengthwise corners of said block having a longitudinal slot through which one end of a horizontally disposed bore opens;

a coupling member comprising a base plate and a laterally disposed plunger extending from said base plate, said plunger being received in said horizontally disposed bore and adapted for limited movement therewithin;

a tool holder having perpendicular working surfaces separated by a longitudinal slot sized to snugly and slidably receive said base plate of said coupling member;

clamping means in said toolpost block movable for engagement with said plunger to laterally move said plunger inwardly and draw said working surfaces of said tool holder into an abutting contact with the two adjacent working surfaces of said toolpost block, said clamping means for moving said plunger inwardly into said toolpost block comprising first and second axially aligned vertically disposed bores intersecting said horizontally disposed bore and respectively disposed above and below said horizontal bore;

said plunger having a tapered bore and positionable between said first and second bores when said plunger is within said horizontal bore;

a clamping pin movable within said first and second bores and having a tapered surface complementary to said plunger tapered bore and means for moving said tapered clamping pin inwardly to engage the wall of said plunger tapered bore to exert a force on said plunger to move the same laterally inwardly into said horizontal bore;

said first bore disposed above said horizontal bore having a cross-sectional area greater than said second bore, said tapered pin having an upper portion slidably disposed in said first bore and a lower portion of a smaller cross-sectional area which is slidably disposed in said second bore, said tapered clamping pin engaging said tapered bore of said plunger while said upper and lower portions are respectively engaged with said first and second bores and laterally supported thereby;

a threaded member engaging said first bore and abutting the upper portion of said clamping pin for moving said clamping pin toward said second bore; and spring means disposed in said second bore for restraining said downward movement of said pin and for urging said clamping pin upwardly toward said first bore when said threaded member is moved away from said plunger 2. The toolpost structure defined in claim 1 further comprising spring means at the inner end of said horizontally disposed bore for exerting a outwardly directed bias against said plunger.

3. The toolpost holder defined in claim 1 further comprising a plurality of said coupling members disposed at each lengthwise corner of said toolpost block.

4. The toolpost holder defined in claim 1 wherein said plunger tapered bore is radially greater than said tapered surface of said clamping member, said plunger tapered bore being eccentric with respect to said first and second bores when said plunger is laterally, inwardly moved to draw said working surfaces in to said abutting contact.

* * * * *